United States Patent
Ohura

(10) Patent No.: US 6,802,350 B2
(45) Date of Patent: Oct. 12, 2004

(54) PNEUMATIC RADIAL TIRES WITH AT LEAST TWO MONOFILAMENT CORD BELT LAYERS

(75) Inventor: Kenichi Ohura, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 180 days.

(21) Appl. No.: 09/911,720

(22) Filed: Jul. 25, 2001

(65) Prior Publication Data

US 2002/0033218 A1 Mar. 21, 2002

(30) Foreign Application Priority Data

Jul. 25, 2000 (JP) .......................................... 2000-224059
Jul. 10, 2001 (JP) .......................................... 2001-209229

(51) Int. Cl.[7] .............................. B60C 9/00; B60C 9/08; B60C 9/20; B60C 9/22; B60C 13/00
(52) U.S. Cl. ...................... 152/454; 152/510; 152/526; 152/527; 152/531; 152/555; 152/556
(58) Field of Search ................................. 152/527, 532, 152/526, 531, 556, 510, 454, 555

(56) References Cited

U.S. PATENT DOCUMENTS

| | | | | |
|---|---|---|---|---|
| 4,819,705 A | * | 4/1989 | Caretta | ........................ 152/527 |
| 5,234,044 A | * | 8/1993 | Bourgois | ..................... 152/527 |
| 5,292,590 A | | 3/1994 | Lin et al. | |
| 5,824,171 A | * | 10/1998 | Miyazono et al. | .......... 152/526 |
| 6,026,878 A | | 2/2000 | Zhang et al. | |
| 6,543,502 B2 | * | 4/2003 | Ohura | ..................... 152/555 X |
| 2001/0054466 A1 | * | 12/2001 | Morii et al. | ................. 152/526 |

FOREIGN PATENT DOCUMENTS

| | | |
|---|---|---|
| EP | 0 301 093 A1 | 2/1989 |
| EP | 0 414 892 A1 | 3/1991 |
| EP | 0 715 971 A2 | 6/1996 |
| EP | 1 167 082 A2 | 1/2002 |
| WO | WO 00/15449 A1 | 3/2000 |

* cited by examiner

Primary Examiner—Adrienne C. Johnstone
(74) Attorney, Agent, or Firm—Sughrue Mion, PLLC

(57) ABSTRACT

A pneumatic radial tire comprises a innerliner, a carcass, a belt, one or more cap layers and a tread, in which the belt is comprised of at least two belt layers each containing rubberized metal or organic fiber monofilament cords, and a rubber gauge between the monofilament cords located in the adjacent belt layers is made 1.5–5 times of a diameter of the monofilament cord.

9 Claims, 3 Drawing Sheets

*Comparative*

PNEUMATIC RADIAL TIRES WITH AT LEAST TWO MONOFILAMENT CORD BELT LAYERS

BACKGROUND OF THE INVENTION

1. Field of the Invention

This invention relates to a pneumatic radial tire, and more particularly to a pneumatic radial tire in which the weight reduction of the tire is realized by a reinforcing structure using a monofilament cord as a cord constituting a belt layer and the degradation of belt durability is advantageously controlled by rationalizing a rubber gauge between the monofilament cords located in the adjacent belt layers.

2. Description of Related Art

In the pneumatic radial tire, the rigidity of the belt is considerably increased for improving so-called hoop effect, so that the weight is generally heavier than that of a pneumatic bias tire. As a result, the degradation of the fuel consumption become a problem. In the radial tire, therefore, various attempts are made for solving such a problem to reduce the tire weight.

For example, as shown in FIG. 3a, there is widely used a belt layer 21 formed by rubberizing metal twisted cords or organic fiber twisted cords as a cord of the belt layer from the old time. Considering a case that the belt layer 21 is replaced with a belt layer 22 formed by rubberizing monofilament cords and having the same elastic modulus as in the belt layer 21 within a usable region thereof as shown in FIG. 3b, a diameter $d_2$ of the monofilament cord can be made smaller than a diameter $d_1$ of the twisted cord and hence the thickness of the belt layer constituted by the cords and the coating rubber can be decreased, so that the weight reduction of the tire can be attained.

Moreover, the term "monofilament cord" used herein means a cord consisting of a single filament without twisting.

However, if it is intended to reduce the tire weight by merely changing the design from the belt layer 21 into the belt layer 22 as mentioned above, the flexible followability of the cord to the coating rubber in case of using the twisted cord is not realized in the deformation of the belt layer using the monofilament cords, so that the shearing strain between the belt layers becomes large and the separation failure between the monofilament cord and the coating rubber is apt to be easily caused at both side end portions of the belt layer by heat generation resulted from such a shearing strain and hence there is a drawback that the durability of the belt lowers.

Therefore, even if the weight reduction of the tire is attempted by using the monofilament cord instead of the twisted cord as a cord of the belt layer as mentioned above, it is strongly demanded to develop a new technique capable of ensuring the sufficient belt durability.

SUMMARY OF THE INVENTION

It is, therefore, an object of the invention to solve the above problem for satisfying such a demand, and to provide a pneumatic radial tire capable of realizing the weight reduction of the tire and effectively controlling the degradation of the belt durability by using a monofilament cord as a cord constituting the belt layer.

According to the invention, there is the provision of in a pneumatic radial tire comprising an innerliner, a carcass toroidally extending between a pair of bead portions and externally contacting with the innerliner, a belt arranged at an outer circumference side of a crown portion of the carcass, one or more cap layers covering the belt over substantially a full width thereof, and a tread arranged at an outer circumference side of the cap layer, an improvement wherein the belt is comprised of at least two belt layers each formed by covering metal monofilament cords or organic fiber monofilament cords with a coating rubber, and a rubber gauge between the monofilament cords located in the adjacent belt layers is made 1.5–5 times of a diameter of the monofilament cord.

In the tire according to the invention, the weight reduction of the tire can be attained by constituting the belt layer with the metal monofilament cords or organic fiber monofilament cords. And also, the rubber gauge between the monofilament cords in the adjacent belt layers is made 1.5–5 times, preferably 2.5–5 times of the diameter of the monofilament cord, so that the rubber gauge between the cords is sufficiently ensured while keeping the above effect of reducing the tire weight, and also the occurrence of the separation failure between the monofilament cord and the coating rubber at both side edge portions of the belt layer based on the heat generation resulted from the shearing strain between the belt layers can be prevented in the deformation of the belt layer, whereby the degradation of the belt durability can effectively be controlled.

When the rubber gauge between the monofilament cords located in the adjacent belt layers exceeds 5 times of the diameter of the monofilament cord, the sufficient weight reduction can not be achieved with the increase of the rubber gauge, while when it is less than 1.5 times, the effect for dispersing the shearing strain between the belt layers by the coating rubber is hardly obtained, and as a result, once the separation occurs between the monofilament cord and the coating rubber at both side end portions of the belt layer, the progress of the separation is fast and the early degradation of the belt durability is worried and hence the sufficient belt durability can not be ensured.

When the belt layer is constituted by arranging a plurality of cord groups, each of which groups being comprised of plural monofilament cords arranged side by side, in parallel to each other, for example, when a plurality of cord groups each comprised of 3–5 straight monofilament cords having a circular section are arranged in parallel to each other, a distance between the cord groups in the belt layer can sufficiently be ensured, so that even if the separation once occurs between the monofilament cord and the coating rubber at both side edge portions of the belt layer, the progress of the separation can be controlled.

In addition to the weight reduction by the belt as mentioned above, it is advantageous to further promote the weight reduction as a whole of the tire by reducing the weight of the innerliner. Concretely, the thickness of the innerliner is preferable to be made a range of 0.15–0.8 mm as a range enabling both the reservation of a sufficient air tightness and the achievement of the weight reduction of the tire.

The carcass is preferable to be comprised of at least one carcass ply containing rubberized polyethylene naphthalate cords therein.

When the weight reduction of the tire is realized by changing design from the belt layer using the twisted cord into the belt layer using the monofilament cord and having the same elastic modulus as in the former belt layer within the usable region thereof and the degradation of the belt durability is advantageously controlled by rationalizing the rubber gauge between the monofilament cords located in the adjacent belt layers, there is a tendency of lowering a breaking tenacity of the belt. In such a pneumatic radial tire, however, when the carcass is comprised of at least one carcass ply containing high-rigidity rubberized polyethylene naphthalate cords therein, the lowering of the breaking tenacity of the belt -can be compensated by the increase of the breaking tenacity of the carcass to mitigate the tension bearing ratio of the belt.

And also, when the belt is reinforced with a cap layer of rubberized polyethylene naphthalate cords extending substantially in a circumferential direction of the tire, the cap layer can sufficiently bear bending rigidity in the deformation of the belt and the like as compared with a case of applying a usually used cap layer of nylon cords, whereby heat generation resulted from the shearing strain between the belt layers is controlled to advantageously prevent the separation failure between the monofilament cord and the coating rubber at both side edge portions of the belt layer and hence the degradation of the belt durability can be avoided.

Furthermore, the lowering of the breaking tenacity of the belt as a weak point when the belt layer using the monofilament cords is used instead of the belt layer using the twisted cords is sufficiently overcome by the synergistic action of the above construction of the cap layer and the above construction of the carcass using the polyethylene naphthalate cords, whereby the weight reduction of the tire can be more manifested.

In addition, when a width of the tread is within a range of 70–80% of a tire maximum width, an excellent steering stability can be ensured while controlling the increase of the tire weight.

That is, when the tread width is less than 70% of the tire maximum width, the ground contact area is decreased and it is obliged to degrade the steering stability, while when it exceeds 80%, the weight of the tread rubber increases and hence it is unavoidable to increase the tire weight.

In the above tire, it is further preferable to reduce the weight of the sidewall portion by decreasing the rubber gauge of the sidewall portion. In this case, in order to compensate for the lowering of the stiffness resulted from the decrease of the rubber gauge of the sidewall portion, a bias insert comprised of organic fiber cords extending at a cord angle within a range of 30–60° with respect to a phantom radial line segment is arranged between a main body and a turnup portion in the carcass so as to extend between a position near to the bead core and a position located outward from the position of the tire maximum width in the radial direction. The bias insert advantageously enhances the longitudinal stiffness of the tire to bring about the improvement of the steering stability.

Particularly, when the cord angle of the organic fiber cord is about 45° with respect to the phantom radial line segment, the longitudinal stiffness becomes remarkably high. When the cord angle is less than 30° or exceeds 60°, the increase of the longitudinal stiffness becomes small.

Moreover, the extension of the bias insert between the position near to the bead core and the position located outward from the position of the tire maximum width in the radial direction is favorable to be effective in the increase of the longitudinal stiffness. However, when the extending region of the bias insert in the radial direction is made narrower than the above, the effect of increasing the longitudinal stiffness becomes smaller.

Furthermore, when a circumferential insert of organic fiber cords extending in the circumferential direction of the tire is arranged in at least a part of a region between a position near to the bead core and a position near to a side edge of the belt instead of the bias insert or in addition to the bias insert, the lateral stiffness of the tire can be increased, while the ride comfort against vibrations can be enhanced while controlling the increase of the radial stiffness.

Moreover, the circumferential insert is preferable to be arranged between the vicinity of the bead core and the vicinity of the position of the tire maximum width in a width in the radial direction of no less than 10 mm in order to bring about a sufficient reinforcing effect by the circumferential insert.

BRIEF DESCRIPTION OF THE DRAWINGS

The invention will be described with reference to the accompanying drawings, wherein:

FIG. 2b is a diagrammatically partial perspective view of the belt shown in FIG. 2a;

DETAILED DESCRIPTION OF THE INVENTION

Figure 1:
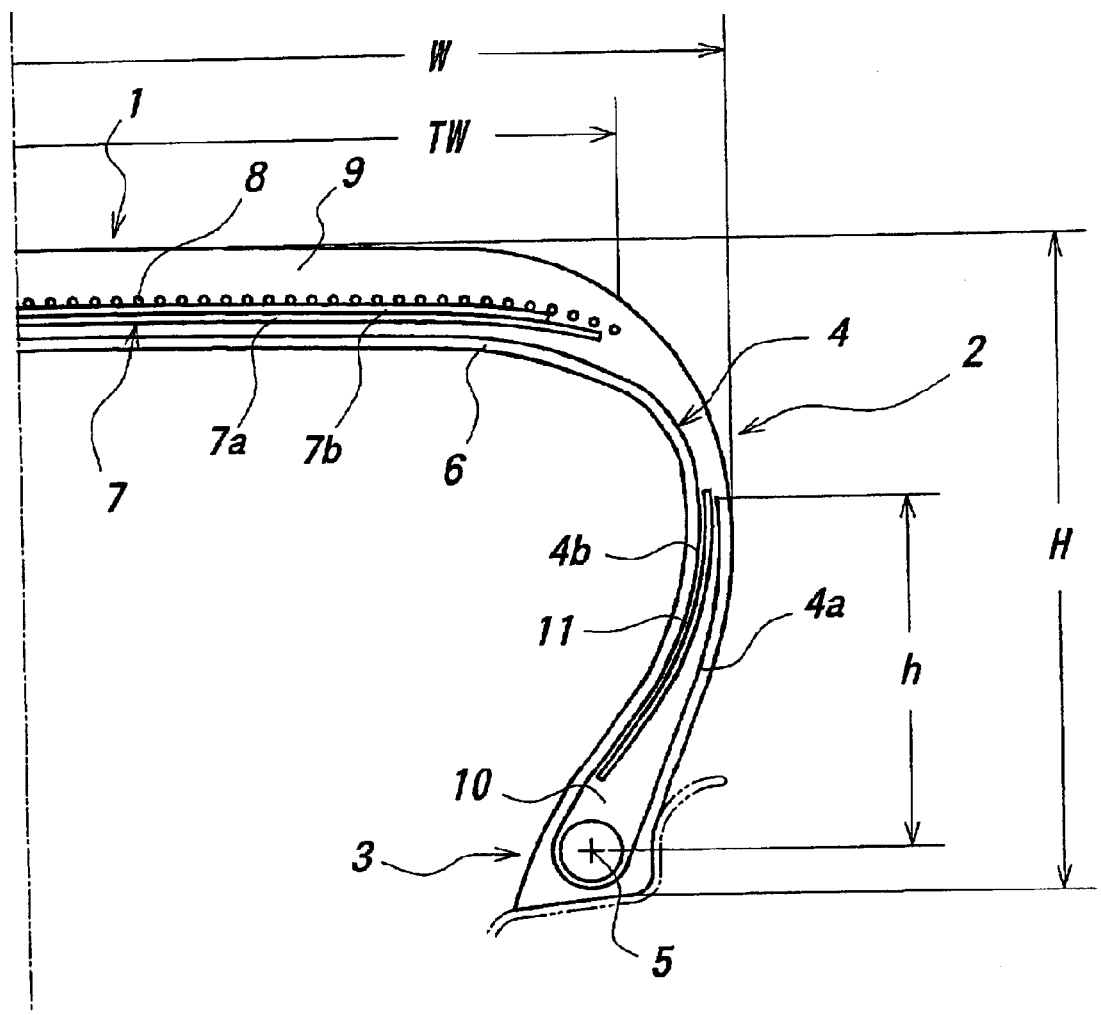
FIG. 1 is a diagrammatically right-half section view of an embodiment of the tire according to the invention.

In FIG. 1 is sectionally shown an embodiment of the pneumatic radial tire according to the invention at a posture of inflating under an air pressure, in which numeral 1 is a tread portion, numeral 2a sidewall portion extending inward from a side end of the tread portion 1 in a radial direction, and numeral 3a bead portion located at an inner circumferential side of the sidewall portion 2.

In the tire 1 shown in FIG. 1, a carcass 4 is toroidally extended from one bead portion 3 to the other bead portion (not shown) to reinforce the portions 1, 2 and 3, and wound around a bead core 5 from an inside of the tire toward outside thereof in the radial direction to form a turnup portion 4a. The carcass 4 is externally contacted with an innerliner 6 having preferably a thickness of 0.15–0.8 mm as an innermost layer of the tire and joined thereto.

Moreover, the carcass 4 is comprised of at least one carcass ply containing rubberized polyethylene naphthalate cords therein.

A belt 7 comprised of at least two belt layers, two belt layers 7a, 7b in the illustrated embodiment is arranged at an outer circumferential side of a crown portion of the carcass 4, and one or more cap layers, a single cap layer 8 in the illustrated embodiment covering the belt 7 over substantially a full width thereof and a tread 9 are successively arranged at an outer circumferential side of the belt 7.

Figure 2A:
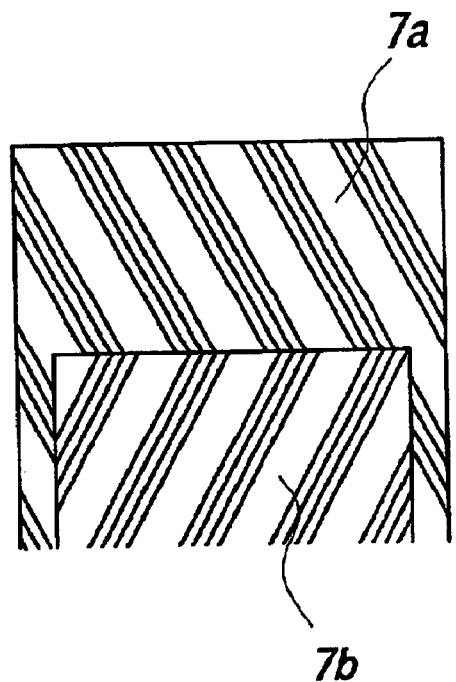
FIG. 2a is a schematic view of a belt used in the tire according to the invention.
Figure 2B:
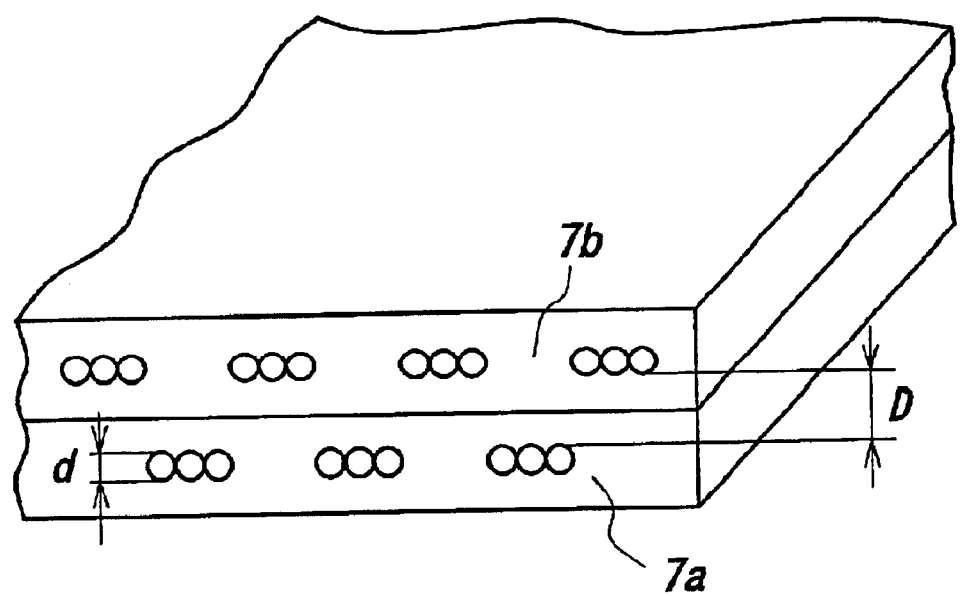
Figure 3A:
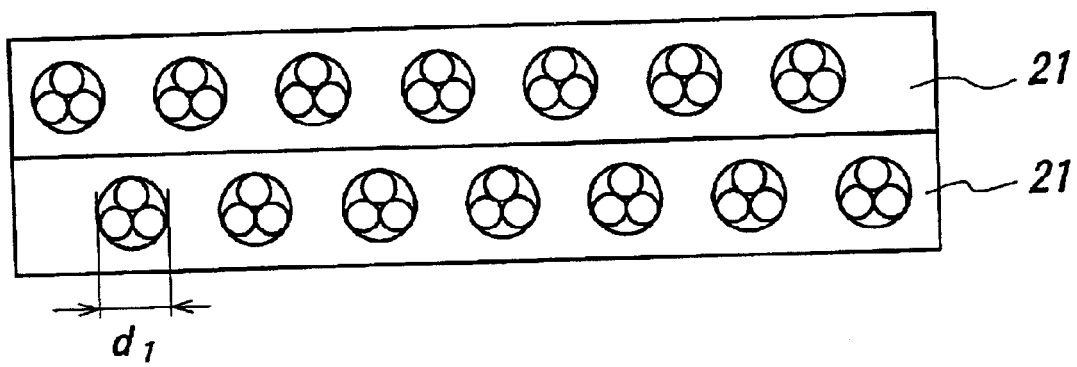
FIG. 3a is a diagrammatically section view of a belt used in the conventional tire.
Figure 3B:
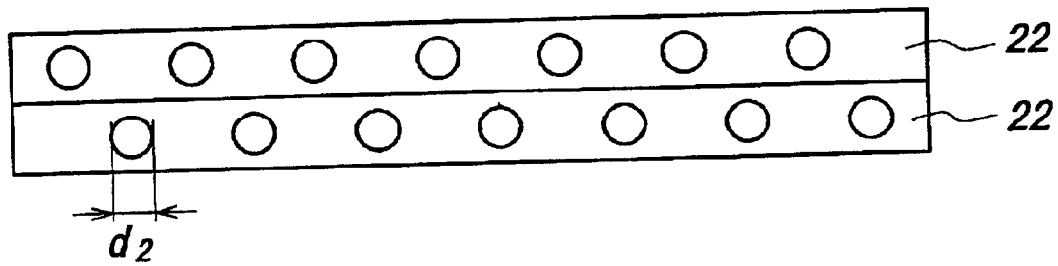
FIG. 3b is a diagrammatically section view of a belt used in a comparative tire.

Each of the belt layers 7a, 7b is a cord layer formed by rubberizing metal monofilament cords or organic fiber monofilament cords. The cords of these layers are crossed with each other as shown in FIG. 2a, in which a rubber gauge D between the monofilament cords located in the adjacent belt layers is made 1.5–5 times, preferably 2.5–5 times of a diameter d of the monofilament cord as shown in FIG. 2b. More preferably, each of the belt layers 7a, 7b is formed by arranging a plurality of cord groups in parallel to each other, each of which groups being formed by arranging plural monofilament cords, three monofilament cords in the illustrated embodiment of FIGS. 2a and 2b side by side.

And also, the cap layer 8 may be formed, for example, by spirally winding a rubberized polyethylene naphthalate cord at the outer circumferential side of the belt 7 so as to extend substantially in the circumferential direction of the tire.

Furthermore, a width TW of the tread 9 is preferable to be a range of 70–80% of a tire maximum width W.

In the tire having the above structure, a bias insert 11 of organic fiber cords extending at a cord angle within a range of 30–60° with respect to a phantom radial line segment is further arranged between a main body 4b and a turnup portion 4a of the carcass 4, and arranged in at least one of an inside and an outside of a bead filler 10 in the widthwise direction of the tire, an inside of the bead filler in FIG. 1. In this case, the bias insert 11 is extended in a region ranging from a position near to the bead core to a position located outward from the tire maximum width in the radial direction.

Moreover, the bias insert 11 may be replaced with a circumferential insert of organic fiber cords extending in the circumferential direction of the tire. In this case, the circumferential insert is preferable to be arranged in at least a part of a region between a vicinity of the bead core and a vicinity of a side edge of the belt, more preferably between the vicinity of the bead core and the vicinity of the position of the tire maximum width at a width of no less than 10 mm in the radial direction.

The following examples are given in illustration of the invention and are not intended as limitations thereof.

There are provided conventional tires 1 and 2, comparative tires 1 to 4 and example tires 1 to 4, each of which tires has a structure omitting the bias insert 11 in FIG. 1 and a tire size of 215/45ZR17 and dimensions as shown in Tables 1 and 2 (Table 1 shows a steel cord used as a cord of a belt layer and Table 2 shows an organic fiber cord used as a cord of a belt layer). With respect to these tires, the tire weight and the belt durability are evaluated to obtain results as shown in Tables 1 and 2.

The evaluation of the belt durability is conducted by cutting a tire to measure a separation length in the belt, after the tire assembled onto a rim of 7JJ is inflated under an air pressure of 230 kPa, mounted onto each of four wheels in domestic passenger car and actually run on a general-purpose road over a distance of 20000 km.

And also, each of the tire weight and the belt durability in Tables 1 and 2 is represented by an index on the basis that the conventional tire 1 or 2 is 100. Moreover, the larger the index value, the lighter the tire weight and the better the belt durability.

In Tables 1 and 2, the term "ration of D/d" means a ratio of rubber gauge D between the cords located in the adjacent belt layers to diameter d of the cord.

TABLE 1

| | | Conventional tire 1 | Comparative tire 1 | Comparative tire 2 | Example tire 1 | Example tire 2 |
|---|---|---|---|---|---|---|
| Belt layer | Material of cord | Steel | Steel | Steel | Steel | Steel |
| | Diameter of cord (mm) | 0.225*1 | 0.21 | 0.21 | 0.21 | 0.21 |
| | Kind of cord | Twisted cord of 1 × 5 construction | Monofilament cord | Monofilament cord | Monofilament cord | Monofilament cord |
| | Arrangement of cord | Plural twisted cords are arranged in parallel to each other at given intervals | Plural cord groups are arranged in parallel to each other at given intervals | Plural cord groups are arranged in parallel to each other at given intervals | Plural cord groups are arranged in parallel to each other at given intervals | Plural cord groups are arranged in parallel to each other at given intervals |
| | D/d ratio | 1.3 | 1.3 | 6 | 2 | 3 |
| | Tire weight (index) | 100 | 115 | 101 | 110 | 105 |
| | Belt durability (index) | 100 | 90 | 103 | 100 | 102 |

*1: Diameter of filament

TABLE 2

| | | Conventional tire 2 | Comparative tire 3 | Comparative tire 4 | Example tire 3 | Example tire 4 |
|---|---|---|---|---|---|---|
| Belt layer | Material of cord | Aramid | Aramid | Aramid | Aramid | Aramid |
| | Size of cord | 1650 dtex *1 | 1100 dtex | 1100 dtex | 1100 dtex | 1100 dtex |
| | Kind of cord | Multifilament cord (twisted) | Monofilament cord | Monofilament cord | Monofilament cord | Monofilament cord |
| | Arrangement of cord | Plural twisted cords are arranged in parallel to each other at given intervals | Plural cord groups are arranged in parallel to each other at given intervals | Plural cord groups are arranged in parallel to each other at given intervals | Plural cord groups are arranged in parallel to each other at given intervals | Plural cord groups are arranged in parallel to each other at given intervals |
| | D/d ratio | 1.3 | 1.3 | 6 | 2 | 3 |
| | Tire weight (index) | 100 | 112 | 100 | 109 | 105 |

TABLE 2-continued

|  | Conventional tire 2 | Comparative tire 3 | Comparative tire 4 | Example tire 3 | Example tire 4 |
|---|---|---|---|---|---|
| Belt durability (index) | 100 | 95 | 107 | 100 | 104 |

*1: Size of a single bundle of filaments, and a construction of twisted cord is 1650 dtex/2.

The term "cord group" in Tables 1 and 2 means a group of three monofilament cords arranged side by side as shown in FIG. 2b.

As seen from Tables 1 and 2, all of the example tires using the steel cord or aramid cord as a cord of a belt layer effectively attain the reduction of the tire weight without degrading the belt durability as compared with the conventional and comparative tires.

As mentioned above, according to the invention, the weight reduction of the tire is attained by constituting the belt with belt layers each containing metal or organic fiber monofilament cords, while the degradation of the belt durability can effectively be controlled by making the rubber gauge between the monofilament cords located in the adjacent belt layers 1.5–5 times of the diameter of the monofilament cord.

What is claimed is:

1. In a pneumatic radial tire comprising an innerliner, a carcass toroidally extending between a pair of bead portions and externally contacting with the innerliner, a belt arranged at an outer circumference side of a crown portion of the carcass, one or more cap layers covering the belt over substantially a full width thereof, and a tread arranged at an outer circumference side of the cap layer, an improvement wherein the belt is comprised of at least two belt layers each formed by covering metal monofilament cords or organic fiber monofilament cords with a coating rubber, and a rubber gauge between the monofilament cords located in the adjacent belt layers is made 1.5–5 times of a diameter of the monofilament cord, wherein each belt layer is constituted by arranging a plurality of cord groups, each of which are comprised of plural monofilament cords arranged side-by-side, in parallel and spaced apart with respect to each other, wherein the cords of the at least two belt layers are crossed with each other, wherein the carcass is comprised of at least one carcass ply containing polyethylene naphthalate cords therein, and wherein the cap layer contains at least one polyethylene naphthalate cord extending substantially in a circumferential direction of the tire.

2. A pneumatic radial tire according to claim 1, wherein the rubber gauge between the monofilament cords located in the adjacent belt layers is made 2.5–5 times of the diameter of the monofilament cord.

3. A pneumatic radial tire according to claim 1, wherein the innerliner has a thickness of 0.15–0.8 mm.

4. A pneumatic radial tire according to claim 1, wherein the tread has a width corresponding to 70–80% of a tire maximum width.

5. A pneumatic radial tire according to claim 1, wherein a circumferential insert of organic fiber cords extending in the circumferential direction of the tire is arranged in at least a part of a region between the vicinity of a bead core in the bead portion and the vicinity of a side edge of the belt.

6. A pneumatic radial tire according to claim 5, wherein the circumferential insert is arranged between the vicinity of the bead core and the vicinity of a position of a tire maximum width at a width of no less than 10 mm in the radial direction.

7. A pneumatic radial tire according to claim 1, wherein a bias insert of organic fiber cords extending at a cord angle within a range of 30–60° with respect to a phantom radial line viewing from a side face of the tire is arranged between a main body and a turnup portion of the carcass and extended between a position near to a bead core in the bead portion and a position located outward from a position of the tire maximum width in a radial direction.

8. A pneumatic radial tire according to claim 7, wherein a circumferential insert of organic fiber cords extending in the circumferential direction of the tire is arranged in at least a part of a region between the vicinity of a bead core in the bead portion and the vicinity of a side edge of the belt.

9. A pneumatic radial tire according to claim 8, wherein the circumferential insert is arranged between the vicinity of the bead core and the vicinity of a position of a tire maximum width at a width of no less than 10 mm in the radial direction.

* * * * *